United States Patent
Fendel et al.

(10) Patent No.: US 9,871,340 B2
(45) Date of Patent: Jan. 16, 2018

(54) LINEAR MOTOR OR VOICE COIL FOR FAST TUNING OF A LASER CAVITY

(71) Applicant: Thorlabs, Inc., Newton, NJ (US)

(72) Inventors: Peter Fendel, Sparta, NJ (US); David Sproles, Newton, NJ (US); James Easter, Newton, NJ (US); Xuan Luo, Newton, NJ (US)

(73) Assignee: THORLABS, INC., Newton, NJ (US)

(*) Notice: Subject to any disclaimer, the term of this patent is extended or adjusted under 35 U.S.C. 154(b) by 0 days.

(21) Appl. No.: 15/294,101

(22) Filed: Oct. 14, 2016

(65) Prior Publication Data
US 2017/0110848 A1    Apr. 20, 2017

Related U.S. Application Data

(60) Provisional application No. 62/242,568, filed on Oct. 16, 2015.

(51) Int. Cl.
*H01S 3/136* (2006.01)
*H01S 3/08* (2006.01)
(Continued)

(52) U.S. Cl.
CPC .............. *H01S 3/136* (2013.01); *H01S 3/081* (2013.01); *H01S 3/0811* (2013.01);
(Continued)

(58) Field of Classification Search
CPC ...... H01S 3/136; H01S 3/08059; H01S 3/081; H01S 3/105; H01S 3/1305; H01S 3/10069; H01S 3/0811
See application file for complete search history.

(56) References Cited

U.S. PATENT DOCUMENTS

| | | | |
|---|---|---|---|
| 5,185,750 A | * | 2/1993 | Kafka .................. H01S 3/1109 372/107 |
| 5,265,109 A | | 11/1993 | Knox |

(Continued)

OTHER PUBLICATIONS

International Search Report with Written Opinion, dated Feb. 2, 2017, for corresponding international application PCT/US2016/057088.
(Continued)

*Primary Examiner* — Xinning Niu
(74) *Attorney, Agent, or Firm* — Graham Curtin, P.A.

(57) ABSTRACT

A tunable laser including: a reflecting mirror; a partially transmitting mirror; a gain medium energized by a pump source; a pair of mirrors surrounding the gain medium, a first prism and a second prism located between the gain medium and the reflecting mirror; the first prism receives radiation from the gain medium and disperses the radiation to the second prism; the second prism receives and directs the radiation towards an optical element which filters the spatially dispersed radiation based on the position to the second prism, the radiation resonates between the reflecting mirror and the partially transmitting mirror; the second prism is placed on a stage moved by a linear motor such that a desired center wavelength is obtained by moving the second prism to a position so as to allow radiation having the desired center wavelength to resonate between the reflecting mirror and the partially transmitting mirror.

12 Claims, 3 Drawing Sheets

(51) Int. Cl.
   *H01S 3/081* (2006.01)
   *H01S 3/10* (2006.01)
   *H01S 3/105* (2006.01)
   *H01S 3/13* (2006.01)

(52) U.S. Cl.
   CPC .......... *H01S 3/08059* (2013.01); *H01S 3/105* (2013.01); *H01S 3/10069* (2013.01); *H01S 3/1305* (2013.01)

(56) References Cited

U.S. PATENT DOCUMENTS

| | | | |
|---|---|---|---|
| 5,757,149 A * | 5/1998 | Sato | G03F 7/70358 318/135 |
| 5,953,354 A | 9/1999 | Staver et al. | |
| 6,594,301 B2 | 7/2003 | Pang | |
| 8,218,587 B2 | 7/2012 | Stoev et al. | |
| 8,514,898 B1 | 8/2013 | Pang | |
| 2002/0054280 A1* | 5/2002 | Tokuda | F16F 15/02 355/53 |
| 2002/0136245 A1* | 9/2002 | Pang | H01S 3/1112 372/20 |
| 2008/0298406 A1* | 12/2008 | Day | B82Y 20/00 372/39 |
| 2015/0085886 A1 | 3/2015 | Boggy | |

OTHER PUBLICATIONS

Black, Bill et al, "Basics of Voice Coil Actuators" Bei Motion Systems Company, Kimco Magnetics Division, San Marcos, California; PCIM Jul. 1993.

McNamara, Jim, "What's the Difference Between Voice Coil Actuators and Solenoids?" Electronic Design; Jun. 19, 2012; ElectronicDesign.com.

* cited by examiner

LINEAR MOTOR OR VOICE COIL FOR FAST TUNING OF A LASER CAVITY

CROSS REFERENCE TO RELATED APPLICATIONS

This application claims the benefit of U.S. Provisional Patent Application No. 62/242,568 filed on Oct. 16, 2015. The disclosure of U.S. Provisional Patent Application 62/242,568 is hereby incorporated by reference.

FIELD OF THE INVENTION

The present invention relates to tuning of a laser, and more specifically to using a linear motor or voice coil in combination with a wavelength selective element inside a laser cavity to allow for fast and backlash free tuning of the center wavelength.

BACKGROUND

Many applications in the physical and life sciences require exciting a sample with a certain wavelength or precise wavelength sweeps over time. A tunable laser is often used to provide the excitation radiation with the wavelength being changed accordingly.

In order to change the wavelength in a laser cavity the cavity needs to be comprised of a broadband gain element and a wavelength selective element or a combination of several elements which together act as a wavelength filter. Examples of a wavelength filter are a birefringent tuning plate or a combination of two prisms, an aperture, and a retro reflector. In the latter case, the light inside the laser cavity is separated by wavelength through the prisms and the aperture filters out the desired wavelength. In order to change the wavelength the aperture or the second prism can be moved. Particularly in modelocked lasers the latter case can be advantageous as it allows manipulating the net cavity dispersion while changing the wavelength. The movement of the prism needs to be smooth and precise as it is part of the cavity. In existing solutions the prism is often moved using a combination of an encoded servo or stepper motor and a lead screw driven translation stage. This setup suffers from slow tuning speed and is subject to wear over time. Many experiments particularly in the life science community try to study the temporal evolution of certain samples and require rapid wavelength jumps or sweeps. Existing solutions have failed so far to satisfy these needs.

The present invention provides a solution to the technical problem of how to change the wavelength of a laser an order of magnitude faster than existing solutions without sacrificing the accuracy of the scan. This invention enables doing experiments which used to require two, synchronized lasers to be done with just one laser.

SUMMARY

An embodiment of the present invention provides a tunable laser including: a reflecting mirror; a partially transmitting mirror; a gain medium; a pair of mirrors surrounding the gain medium, one or two of the pair of mirrors being curved; a pump source configured to energize the gain medium; a first prism and a second prism located between the gain medium and the reflecting mirror; wherein the first prism is configured to receive radiation from the gain medium and disperse the radiation to the second prism; wherein the second prism is configured to receive the radiation from the first prism, and direct the radiation towards an optical element or an assembly of optical elements which filters the spatially dispersed radiation based on its position relative to the second prism, such that the radiation resonates between the reflecting mirror and the partially transmitting mirror; wherein the second prism is placed on a movable stage such that a desired center wavelength of the laser output from the partially transmitting mirror is obtained by moving the stage carrying the second prism to a position so as to allow a portion of the dispersed radiation having the desired center wavelength to resonate between the reflecting mirror and the partially transmitting mirror; and wherein the stage is moved by a linear motor.

An embodiment of the present invention provides a setup to achieve wavelength changes of several hundred nanometers in less than 100 ms. Note that the use of the term "linear motor" and "voice coil" will be used synonymously throughout this discloser. Linear motors distinguish themselves from servo or stepper motors through high acceleration and high linear speed for translation. In addition, as they operate contactless, the motion is exceptionally smooth and doesn't interrupt active lasing while the laser is tuned.

DETAILED DESCRIPTION OF THE PREFERRED EMBODIMENTS

Figure 1:
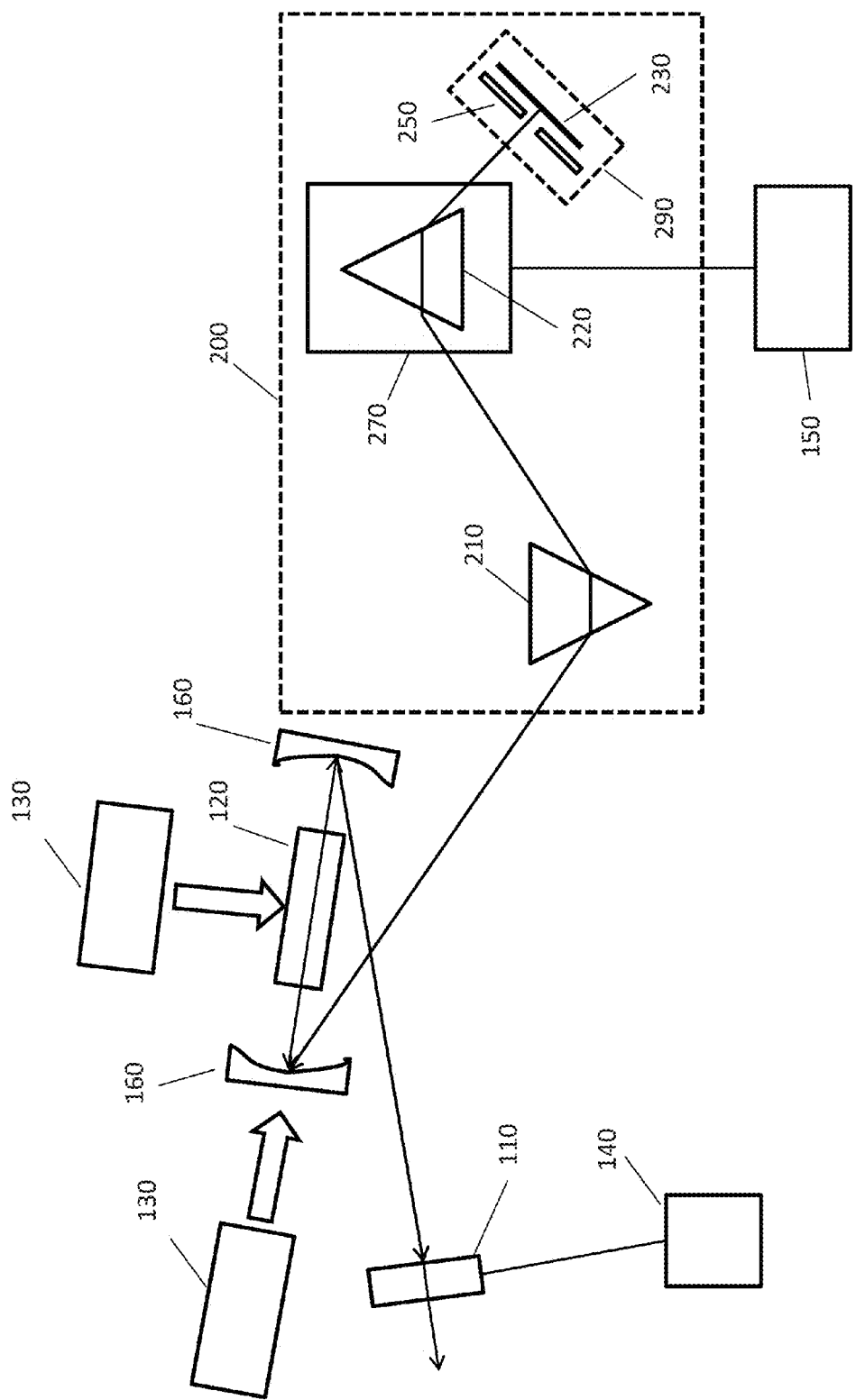
FIG. 1 shows a tunable laser according to an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

FIG. 1 shows a tunable laser according to an embodiment of the invention. A reflecting mirror 230 and a partially transmitting mirror 110 forms a resonator along the optical path as shown. A gain medium 120 is located along the optical path between the two mirrors 110, 230. Two mirrors 160 surround the gain medium 120. In one preferred embodiment, one or both mirrors 160 are curved so as to form a stable cavity. In one embodiment, the gain medium 120 is pumped by a pump source 130 longitudinally. Alternatively, in another embodiment, the gain medium 120 is pumped by a pump source 130 transversely. In one embodiment, pump source 130 is an optical pump, such as a DPSS, a semiconductor laser or a fiber laser. In another embodiment, the pump source 130 is an electrical pump. The choice of a suitable pump source depends on the gain medium used. The tuning portion 200 includes a first prism 210, a second prism 220, an aperture 250 and the reflecting mirror 230. The apex of the first prism 210 is pointing in an opposite direction of the apex of the second prism 220.

Note that when the prism pair 210, 220 is placed inside a laser resonator, it can be used for wavelength tuning. Also, the prism pair can be used for dispersion compensation. Each time light passes through the optical elements within a laser cavity, positive (commonly referred to as normal) dispersion occurs. The prisms themselves contribute positive dispersion. However, when configured properly the prism pair can introduce negative dispersion as light with longer wavelength travels extra distance in between the two prisms compared to light with shorter wavelength. With a careful choice of prism pair geometry it is possible to dispersion compensate all other elements within the cavity.

Figure 2:
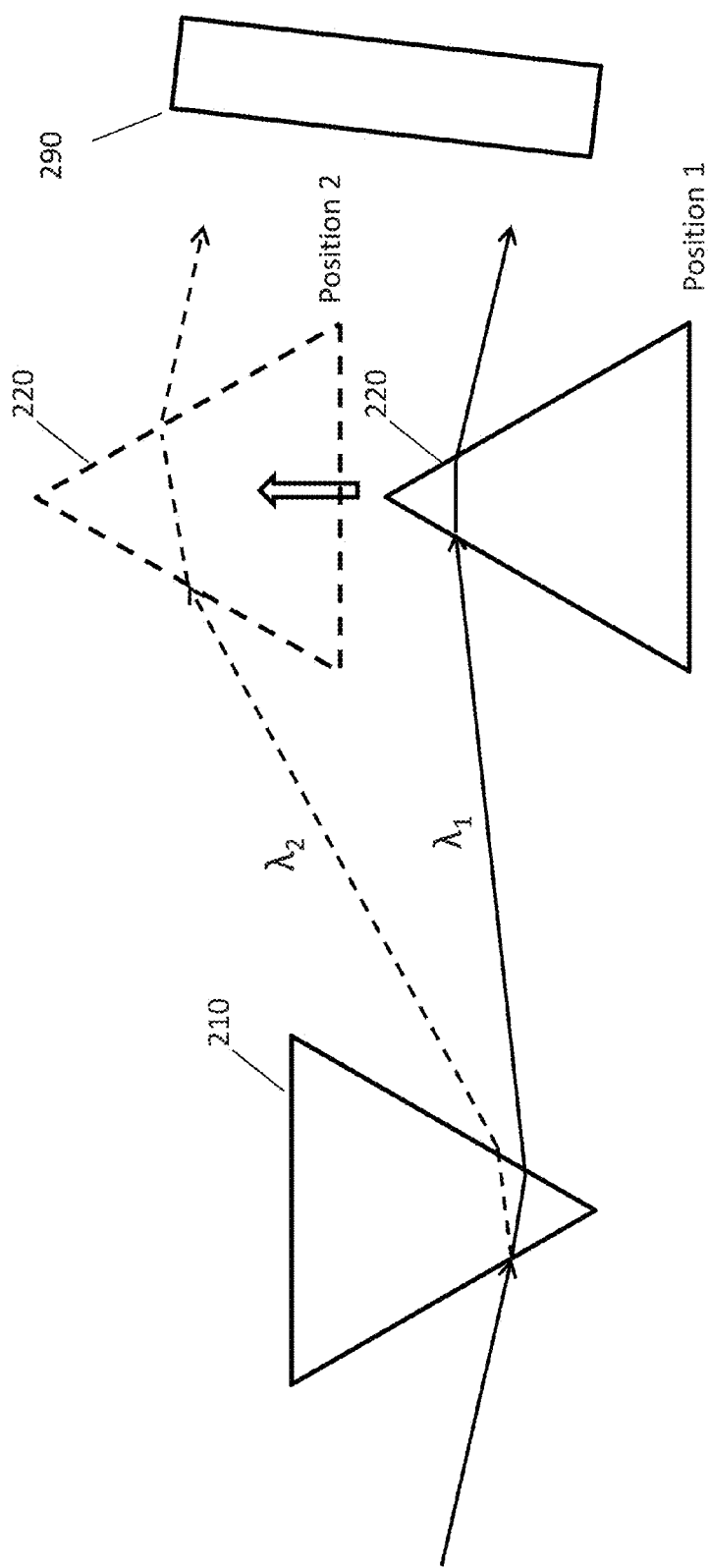
FIG. 2 shows the dispersion of light by prisms.

The spatial separation of different wavelength (or frequency) components can be used for wavelength tuning of the laser by placing the prism pair within the laser resonator. As shown in FIG. 2, when a light passes through the first prism 210, the light is dispersed into different wavelengths. This dispersion occurs because the angle of refraction is dependent on the refractive index of the prism material which in turn is slightly dependent on the wavelength of light that is travelling through it. This means that different wavelengths of light will travel at different speeds, and so the light will disperse, with longer wavelengths being refracted less than shorter wavelengths.

For simplicity, FIG. 2 shows that light having center wavelengths $\lambda_1$ and $\lambda_2$ are dispersed by the prism 210 into two different directions. When the second prism 220 is at position 1, it intercepts the light with center wavelength $\lambda_1$. When the second prism 220 is at position 2, it intercepts the light with center wavelength $\lambda_2$. Thus, if the prism pair 210, 220 is placed inside the resonator, the laser wavelength resonant in the cavity can be tuned by moving the prism 220 in combination with an element 290 that filters radiation based on its position relative to prism 220.

In one embodiment, the filtering element 290 is an aperture 250 in combination with a reflecting mirror 230. In yet another embodiment, the filtering element 290 can be a reflecting mirror with a certain geometrical shape or curvature advantageous to selecting a wavelength out of the dispersed radiation. Alternatively, in another embodiment the aperture 250 or the reflecting mirror 230 can be moved to select a different wavelength to be resonant in the cavity.

As discussed above, the movement of the prism needs to be smooth and precise as it is part of the cavity. In existing systems the prism is often moved using a combination of an encoded servo or stepper motor and a lead screw driven translation stage. However, these existing systems suffer from slow tuning speed and subject to wear over time.

Figure 3:
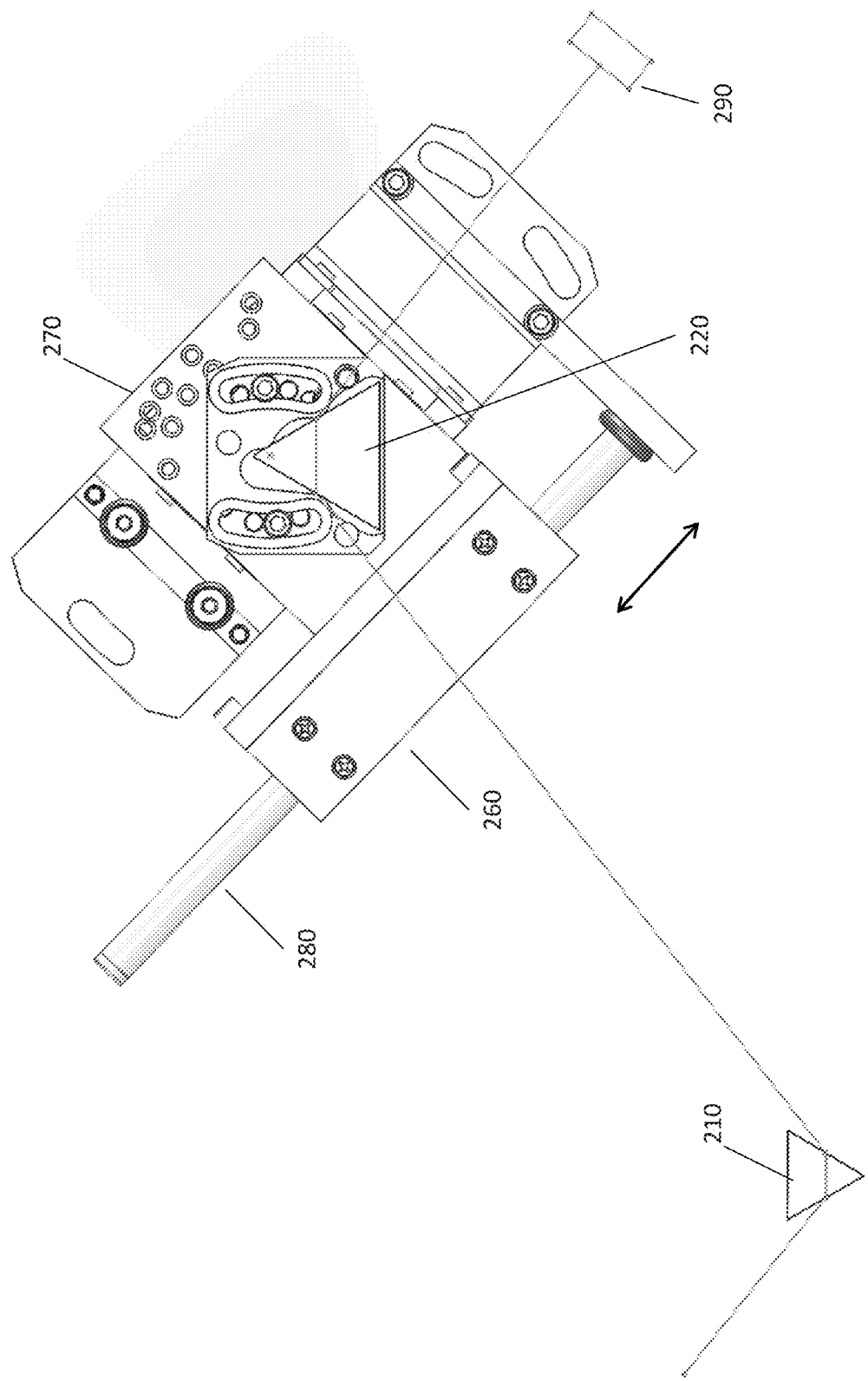
FIG. 3 shows the details of a tunable section according to an embodiment.

FIG. 3 shows the details of the tuning portion 200 of a tunable laser according to an embodiment. The prism 220 is sitting on a translation stage 270. The translation stage is moved by a linear motor 260. The stationary magnetic drive rod 280 of the linear motor 260 moves the stage 270 when a current is applied to the linear motor. By controlling the current applied to the linear motor, the prism 220 can be moved to a desired location so as to intercept the portion of dispersed light having the desired center wavelength from the prism 210. Alternatively the motor can be fixed and the rod attached to the stage.

In one embodiment, a detector 140 may be used to detect the laser output spectrum, and the detected results can be fed to a feedback controller 150 for controlling the movement of the stage. The controller may also control the pump source in conjunction with the tuning to output well controlled tuned pulses.

In yet another embodiment the linear motor can use an internal encoder to know its position and the wavelength can be set through a lookup table. The lookup table includes the output wavelengths that correspond to different positions of the linear motor. This means that the wavelength is set in an 'open-loop' approach.

A liner motor or a voice coil actuator operates by supplying a current to a coil or pair of coils located in the motor housing. The current in the coil interacts with the magnetic field of magnets in the magnetic rod resulting in a force based on the Lorentz Force Principle. This force causes a relative movement between the motor housing and the magnetic rod. Some linear motors/voice coil actuators are based on a moving coil design and others are based on a moving magnet design.

Linear motors or voice coils are suitable in applications where high acceleration, high speed, and precise control are necessary. Therefore, an embodiment of the present invention realizes the unique advantages of linear motors/voice coils in lasers in which rapid and accurate tuning of the wavelength is required. It satisfies a long-felt need which was recognized, persistent and not solved by existing methods of moving the stage quickly and precisely, which is required in many life science experiments.

Although translation of stage in one dimension is disclosed in the embodiments illustrated above, it is contemplated that the tuning element can travel in two-dimensional or three-dimensional space. For example, two linear motors can be used to move the tuning element in the x-y plane. Therefore, the prism can be moved at any angle with respect to the optical path, resulting in more flexible, precise, and rapid tuning of the laser.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A tunable laser comprising:
   a reflecting mirror;
   a partially transmitting mirror;
   a gain medium;
   a pair of mirrors surrounding the gain medium, one or two of the pair of mirrors being curved;
   a pump source configured to energize the gain medium;
   a first prism and a second prism located between the gain medium and the reflecting mirror;
   wherein the first prism is configured to receive radiation from the gain medium and disperse the radiation to the second prism;
   wherein the second prism is configured to receive the radiation from the first prism, and direct the radiation towards an optical element or an assembly of optical elements which filters the spatially dispersed radiation based on its position relative to the second prism, such that the radiation resonates between the reflecting mirror and the partially transmitting mirror;
   wherein the second prism is placed on a movable stage such that a desired center wavelength of the laser output from the partially transmitting mirror is obtained by moving the stage carrying the second prism to a position so as to allow a portion of the dispersed radiation having the desired center wavelength to resonate between the reflecting mirror and the partially transmitting mirror; and
   wherein the stage is moved by a linear motor configured to change the wavelength the laser output by at least 100 nm within 1 second.

2. The tunable laser of claim 1, further comprising an aperture in front of the reflecting mirror.

3. The tunable laser of claim 1, wherein the reflecting mirror is a curved mirror.

4. The tunable laser of claim 1, further comprising a detector configured to detect the laser radiation output from the partially transmitting mirror.

5. The tunable laser of claim 4, further comprising a controller configured to control the linear motor based on a result from the detector.

6. The tunable laser of claim 4, wherein the controller is further configured to control the pump source based on a result from the detector.

7. The tunable laser of claim 6, wherein the detector configured to detect a spectrum of the laser radiation output from the partially transmitting mirror.

8. The tunable laser of claim 1, wherein the stage or an assembly of stages is movable in a two-dimensional plane, and is moved by a linear motor along one direction and by another linear motor along another direction.

9. The tunable laser of claim 1, wherein the first prism is placed on another movable stage.

10. The tunable laser of claim 1, wherein the reflecting mirror is placed on another movable stage.

11. The tunable laser of claim 2, wherein the aperture is place on another movable stage.

12. The tunable laser of claim 1, wherein the linear motor comprises an internal encoder to determine its position and the wavelength can be set through a lookup table.

* * * * *